Patented Sept. 16, 1924.

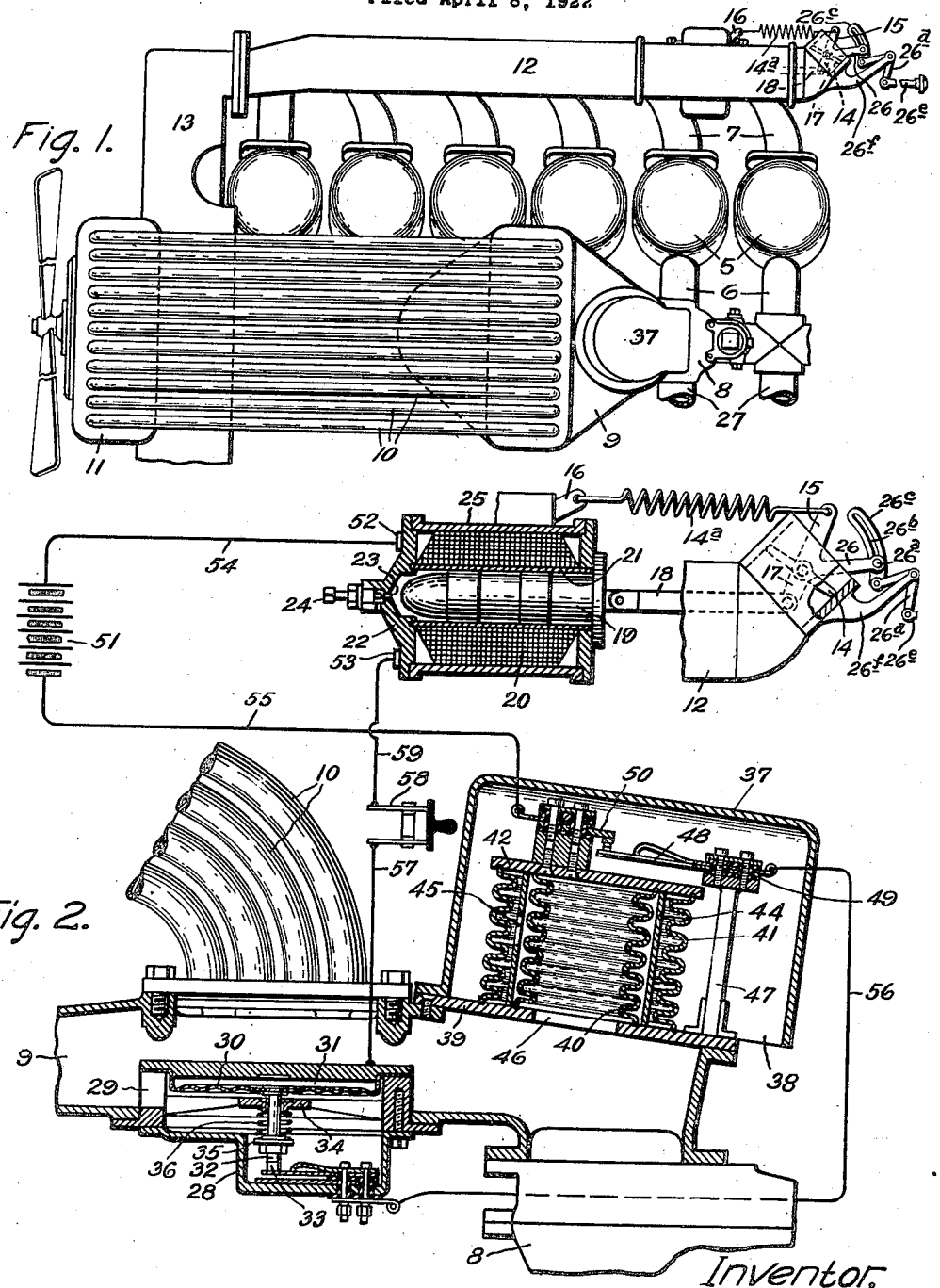

1,508,731

UNITED STATES PATENT OFFICE.

REGINALD G. STANDERWICK, OF LYNN, MASSACHUSETTS, ASSIGNOR TO GENERAL ELECTRIC COMPANY, A CORPORATION OF NEW YORK.

CONTROL MECHANISM FOR AEROPLANE SUPERCHARGERS.

Application filed April 8, 1922. Serial No. 550,932.

*To all whom it may concern:*

Be it known that I, REGINALD G. STANDERWICK, a citizen of the United States, residing at Lynn, in the county of Essex, State of Massachusetts, have invented certain new and useful Improvements in Control Mechanism for Aeroplane Superchargers, of which the following is a specification.

The present invention relates to superchargers for aeroplanes and has for its object to provide an improved controlling mechanism for regulating the degree or amount of supercharging.

As is well known, a supercharger is used to furnish the aeroplane engine with air at sea level or other desired pressure, irrespective of the altitude of the aeroplane, and comprises essentially an air compressor which delivers air to the carburetor or carburetors of the engine. In connection with the use of superchargers it is advisable that the regulation of the supercharger be under the control of the aviator to a certain degree. It is desirable, however, that the arrangement be such that at lower altitudes the aviator cannot supercharge above a predetermined high pressure, a thing likely to cause preignition, while at higher altitudes, it is desirable that the supercharger be not overloaded in its efforts to maintain the desired supercharger pressure. For example, a supercharger designed to provide air at sea level pressure at an altitude of 20,000 feet might be overloaded and damaged if it be attempted to make it provide air at sea level pressure at an altitude of 30,000 feet. On the other hand, at an altitude of 10,000 feet the supercharger would be capable of compressing air to a pressure higher than it would be advisable to use in the engine.

More particularly, the object of my invention is to provide an improved regulating or controlling mechanism which, while leaving the control of the supercharging primarily in the hands of the aviator, will prevent automatically either over supercharging or overloading of the supercharger.

In the drawing, Fig. 1 is a diagrammatic plan view of an aeroplane engine equipped with a supercharger having a control mechanism embodying my invention, and Fig. 2 is a sectional view of certain parts together with a diagrammatic view of the electrical circuits.

In the present instance I have shown my invention carried out in connection with a supercharger of the type comprising a centrifugal compressor driven by a turbine which in turn is operated by exhaust gases from the aeroplane engine, the flow of exhaust gases to the turbine being regulated by valve means controlling the flow of exhaust gases to atmosphere, this being a known arrangement. It will be understood, however, that the invention may be carried out in connection with any desired type of supercharger drive.

Referring to the drawing, 5 indicates cylinders of an aeroplane internal combustion engine, 6 indicates intake pipes, and 7 indicates exhaust pipes, there being an intake pipe and an exhaust pipe for each cylinder. The intake pipes 6 are connected to carburetors indicated diagrammatically at 8. Air is supplied to carburetors 8 from a manifold 9 connected by pipes 10 to the discharge side of the supercharger 11. The supercharger is shown diagrammatically only but it will be understood that it may comprise a suitable centrifugal compressor which takes air from the atmosphere, compresses it, and delivers it to the pipes 10, the air in passing through the pipes 10 being cooled prior to delivery to the carburetors. The compressor may be driven by a turbine wheel actuated by exhaust gases from the engine cylinders and to this end exhaust pipes 7 are connected to a manifold 12 which at one end is open to the atmosphere and at the other end connects with a casing 13 having a suitable nozzle box in which are nozzles for directing the exhaust gases to the turbine wheel. The specific structure of the turbine and compressor forms no part of the present invention and they are accordingly indicated diagrammatically only. The flow of exhaust gases from manifold 12 to the turbine nozzles is regulated by valve 14 at the open end of the exhaust manifold 12. When valve 14 is closed all the exhaust gases will be delivered to the turbine while when the valve 14 is open the exhaust gases will discharge directly to atmosphere and only a small amount will be supplied to the turbine. At intermediate positions of valve 14 more or less exhaust gas will be supplied to the turbine as is obvious.

Valve 14 is biased to open position by a spring 14ª connected at one end to an arm 15 carried on the valve spindle and at the other end to a fixed lug 16. Formed integral with arm 15 is an arm 17 connected by a link 18 to the core 19 of a solenoid, the winding of which is indicated at 20.

Core 19 slides in a sleeve 21 with which it makes a close fit, and the inner open end of the sleeve is covered by a head 22 in which is a vent 23, the area of which can be regulated by a screw 24. Head 22 is suitably fastened to the shell 25 of the solenoid. Formed integral with arms 15 and 17 is a third arm 26 provided with a pin 26ª at its end which rides in a slot 26ᵇ formed in a link 26ᶜ. Link 26ᶜ is pivotally connected at one end to one arm of a bell crank lever 26ᵈ, the other arm of which is connected to a rod 26ᵉ which terminates at a point within the reach of the aviator and which is used by him for manually opening the valve 14. Bell crank lever 26ᵈ is pivoted at its elbow on a fixed post 26ᶠ. In the present instance I have shown only one half of the aeroplane engine. It will be understood that in the particular instance there will be a second row of cylinders connected to the carburetors by pipes 27 and discharging to an exhaust manifold, the duplicate of that shown at 12, and arranged in exactly the same way, except that its outer end instead of being provided with a blast gate or valve such as 14, is closed. In other words, the particular engine illustrated is of a twelve-cylinder V-type arrangement such as is in common use in aeroplanes. The portion of the engine shown is sufficient to illustrate my invention since the particular type of engine does not enter into it.

Referring now particularly to Fig. 2, I provide in connection with the manifold 9 a casing 28 which communicates through an opening 29 with manifold 9. In the present instance the casing is shown as being bolted directly to a wall of manifold 9. In casing 28 is arranged a diaphragm 30 providing a sealed chamber 31. Carried by diaphragm 30 is a contact 32 adapted to engage a contact 33 carried by, but insulated from, casing 28. Contact 32 passes through a suitable fixed guide 34 and has on its end an adjustable collar 35 between which and guide 34 is arranged a coiled spring 36, which acts in a direction tending to move contact 32 into engagement with contact 33. By adjusting the tension of spring 36 the pressure at which diaphragm 30 will move can be varied.

Sealed chamber 31 may or may not contain a certain amount of air, depending on the operating condition desired. If the chamber contains a certain amount of air, the diaphragm will be responsive to both the temperature and the pressure of the air delivered by the supercharger. If it is desired to have the diaphragm respond to pressure only the chamber 31 will be exhausted of air. In any event the arrangement is such that the air pressure in chamber 31, if any, plus the force of spring 36 is such that diaphragm 30 will be moved to separate contacts 32 and 33 when the pressure on it reaches the desired maximum supercharger pressure, for example, sea level atmospheric pressure.

Connected to manifold 9 is a second casing 37 which is open at 38 to atmosphere. Casing 37 comprises a cover plate 39 which is fixed over an opening in a wall of manifold 9, and carried by plate 39 are two spaced concentric diaphragms 40 and 41. At one end these diaphragms are fixed to plate 39 and at the other end they are fixed to a head 42. The air is exhausted from the annular space 43 formed between diaphragms 40 and 41, and in such space is an annular wall 44 which forms a stop to hold the diaphragms from collapsing beyond a predetermined amount. Annular wall 44 may be fixed to plate 39 but is not fixed to head 42. In wall 44 are one or more openings 45 in order that the pressure in chamber 43 will be uniform. The interior of diaphragm 40 communicates through an opening 46 in plate 39 with manifold 9 so that the interior of diaphragm 40 and the portion of head 42 directly over it are subjected on their inner surfaces to the supercharger pressure. The outer surface of head 42 is subjected over its entire area to altitude atmospheric pressure. Fixed on plate 39 is a post 47 which carries at its upper end a contact 48 insulated from the post as indicated at 49, and carried by head 42 and suitably insulated therefrom is a second contact 50 adapted to engage contact 48.

The area of head 42 subjected to altitude atmospheric pressure bears such relation to the area subjected to supercharger pressure that as long as the ratio between such pressures does not exceed a predetermined value, contacts 48 and 50 remain in engagement. When the ratio exceeds this value, however, diaphragms 40 and 41 will be expanded and will move contact 50 from engagement with contact 48. At 51 is a suitable source of electrical energy, such as a storage battery. The terminals of solenoid 20 are indicated at 52 and 53 and they are connected in a circuit comprising wire 54, battery 51, wire 55, contact 50, contact 48, wire 56, contact 33, contact 32, wire 57, switch 58 and wire 59 to terminal 53.

When the foregoing circuit is closed, the solenoid will hold blast gate or valve 14 closed while when the circuit is opened spring 14ª will move valve 14 toward open position. The closing and opening movements of valve 14 are dampened by the dashpot effect produced by core 19 moving in sleeve 21, screw 24 being adjustable to make the area of vent 23 such that the desired dampening of the movements is obtained.

The operation is as follows: The electric circuit through contacts 32, 33 and 48, 50 being closed, solenoid 20 acts to pull valve 14 closed against the action of spring 14ª, the solenoid being sufficiently strong to overcome the action of the spring. However, valve 14 can be opened manually by hand control rod 26ᵉ against the action of the solenoid. Assuming valve 14 is closed, all the exhaust gases from the engine will be directed to the turbine wheel of the supercharger whereby it will be operated to supply supercharged air to the engine. As soon, however, as the supercharger pressure exceeds the desired maximum value, diaphragm 30 will be moved to bring contact 32 from engagement with contact 33 thus breaking the circuit through solenoid 20 whereupon spring 14ª will move valve 14 toward open position, the movement being dampened by the dashpot effect of core 19 in sleeve 21. Opening of valve 14 will permit exhaust gases to escape directly to atmosphere which will effect a slowing down of the speed of the supercharger and a decrease in the supercharger pressure. As soon as the supercharger pressure comes again to a value below the maximum, contact 32 will move again into engagement with contact 33 closing the circuit through solenoid 20 which will move valve 14 toward closed position, such movement being dampened by the dashpot effect already referred to. Thus the supercharger pressure will be again increased. It will thus be seen that diaphragm 30 forms a device responsive to the supercharger pressure which acts automatically to maintain the supercharger pressure at a desired maximum value.

In case the ratio between the supercharger pressure and the altitude atmospheric pressure exceeds the desired predetermined value, a thing which may occur at high altitudes, the supercharger pressure acting on the inner surface of head 42 within diaphragm 40 will expand diaphragms 40 and 41 thus lifting contact 50 from engagement with contact 48 which will open the circuit of solenoid 20 and permit spring 14ª to pull valve 14 toward open position thus effecting a decrease in the supercharger pressure. Diaphragms 40, 41 thus form a differential pressure device which serves to prevent the ratio between the supercharger air pressure and the altitude atmospheric pressure from exceeding a predetermined value. The supercharger pressure ratio is thus automatically limited and since the supercharger pressure ratio is directly proportional to the speed of the supercharger, the result is that the device serves to automatically limit the speed of the supercharger.

The aviator may at any time place valve 14 in wide open position by means of his hand control or he may place it in an intermediate position to obtain a desired amount of supercharging as long as it is below the maximum amount for which diaphragm 30 is set. When this maximum is reached, the control will be taken away from the aviator and the pressure automatically prevented from exceeding the desired maximum.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, an internal combustion engine, a supercharger for supplying compressed air thereto, regulating means for the supercharger, electromagnetic operating means for said regulating means, an electric circuit therefor, and means responsive to the supercharger air pressure and to the ratio between the supercharger air pressure and the altitude atmospheric pressure for controlling said electric circuit.

2. In combination, an internal combustion engine, a supercharger for supplying compressed air thereto, a valve for regulating the supercharger, a solenoid having its core connected to the valve, and an electric circuit for the solenoid, which is controlled by the supercharger pressure and by the ratio between the supercharger pressure and the altitude atmospheric pressure.

3. The combination with an aeroplane having an internal combustion engine, a supercharger supplying air to the engine, and means for controlling the supercharger, of operating means for said controlling means comprising a solenoid having its core connected to the controlling means, an electric circuit for the solenoid, a movable member responsive to the supercharger air pressure controlling said circuit, and a second movable member responsive to the ratio between the supercharger air pressure and the altitude air pressure controlling said circuit.

4. In combination, an internal combustion engine, a supercharger for supplying compressed air thereto, a valve for regulating the supercharger, a solenoid having its core connected to the valve, a spring connected to the valve for biasing it toward a position to decrease the speed of the supercharger, an electric circuit for the solenoid, and contact means responsive to the supercharger air pressure and to the ratio between the supercharger air pressure and the altitude atmospheric pressure for controlling said circuit.

In witness whereof, I have hereunto set my hand this 27th day of March, 1922.

REGINALD G. STANDERWICK.